April 16, 1929.  E. S. BRADFIELD  1,709,387
SUPPORTING BRACE FOR MOTION PICTURE CAMERAS
Filed May 17, 1928
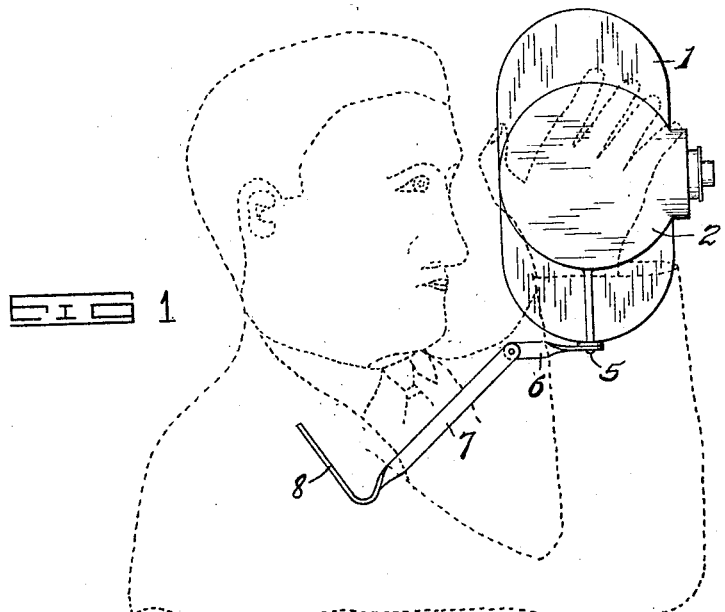
FIG. 1
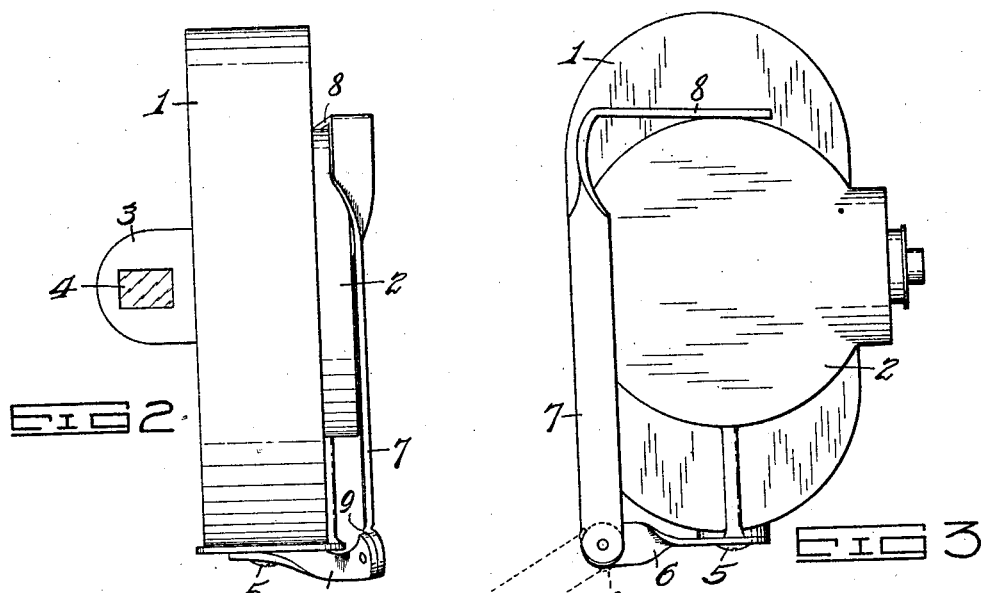
FIG. 2
FIG. 3
INVENTOR
E. S. Bradfield
BY
ATTORNEY Patented Apr. 16, 1929.

1,709,387

UNITED STATES PATENT OFFICE.

EDMUND S. BRADFIELD, OF BARNESVILLE, OHIO.

SUPPORTING BRACE FOR MOTION-PICTURE CAMERAS.

Application filed May 17, 1928. Serial No. 278,458.

This invention relates broadly to film cameras, and more specifically to a supporting brace for such cameras.

The primary object of the invention is to provide an attachment for motion picture cameras whereby such a camera may be more or less rigidly supported or braced relative to the body of the user during the making of film exposures.

A further object is to provide a brace of the character mentioned which is readily foldable or shiftable relative to the camera and which, when occupying its folded nonoperating position, is more or less snugly nested against the camera in a position wherein it occupies small space, thereby to permit of its reception in the usual camera case without alteration of the form or size of the latter.

In describing the invention in detail, reference is herein had to the accompanying drawings, in which—

Figure 1 is a side elevation of a motion picture camera equipped with the invention, illustrating its use;

Figure 2 is an enlarged rear elevation of the same, showing the brace in its folded position; and—

Figure 3 is a side elevation of the same.

Referring to said drawings, 1 designates the camera body, 2 the circular motor spring casing which is formed integrally with said body, and 3 the usual barrel forming a sight passage through which the user may sight for focusing the camera upon the object to be photographed, said barrel having therein a sight glass 4 and a lens (not shown).

Rigidly attached to the under side of the camera body 1, as by means of a screw 5, is an arm or bracket 6 which, extending at an angle of approximately 45° to the plane of the body 1, projects somewhat past the plane of the side of the motor spring casing 2. Said screw 5 is threaded within the socket (not shown) which is ordinarily provided in the body 1 for the reception of a threaded stem or post carried on the head of a tripod when the latter is employed as a support for the camera.

The bracket 6, herein shown as formed of a length of sheet metal which is twisted intermediate its ends to dispose its outer end in a vertical plane, has pivotally mounted upon its said outer end an end of a brace arm 7 which may also be formed of a strip of sheet metal, as shown. Said arm 7 has its opposite end shaped to form an angularly disposed rest 8 which, in the extended position of the arm, is adapted to seat against the shoulder of the user when the camera is supported by hand in the usual operating position wherein the passage in the barrel 3 is alined with the eye of the user, as shown in Fig. 1.

The brace arm 7 normally occupies a substantially upright position parallel and closely adjacent to the side of the motor-spring casing 2 and adjacent to the rear edge of said casing, as shown in Figs. 2 and 3. The outer end of the bracket 6 is inclined at such an angle that, in the operative hand-supported position of the camera, it points in the direction of the user's right shoulder, thereby to direct the thereto-pivoted brace arm, in the outward swinging movement of the latter, to a position wherein its angularly disposed end 8 may seat against such shoulder.

An inwardly directed lug 9, preferably formed by indenting an edge of the pivoted end portion of the brace arm 7, is designed to engage the lower edge of the adjacent end of the bracket 6 for limiting the extent of outward swinging movement of the brace arm.

In the folded position of the brace arm the angular end 8 thereof, which is more or less resilient, seats upon the topmost surface of the motor spring casing 2, being sprung slightly upward in approaching seating position, and, therefore, binding upon said casing to the extent that it is self-retained against chance displacement.

When said brace arm occupies its normal folded position, it is readily receivable in the usual hand case in which the camera is carried without alteration in the form or size of the case.

What is claimed is—

1. A brace attachment for motion-picture cameras, comprising a bracket attached to the lower part of the camera body, and a brace arm having one end pivotally mounted on said bracket and having an angularly disposed rest on its opposite end, said arm normally occupying substantially upright position in which its said rest seats upon a part of the camera, and being shiftable to an extended position wherein said rest may seat against the shoulder of the user when the camera is hand supported in operating position.

2. A brace attachment for motion-picture cameras, comprising a bracket attached to the lower part of the camera body, and a brace arm having one end pivotally mounted on said bracket and having a rest on its opposite end, said arm being normally disposed in a substantially upright position parallel and in close proximity to a wall of the camera and being movable to an extended position for disposing said rest in seated relation to a shoulder of the user when the camera is hand supported in operating position.

3. A brace attachment for motion-picture cameras, comprising a bracket attached to the lower part of the camera body, and a brace arm having one end pivotally mounted on said bracket and having a rest on its opposite end, said arm being normally disposed in a position closely adjacent to a wall of the camera and being movable on its pivotal mounting to a position wherein its said rest may seat against a shoulder of the user when the camera is hand supported in operating position.

4. The combination with a motion picture camera, of a bracket attached to the lower part of said camera, and a brace arm pivotally mounted on said bracket, said arm being adapted in its outwardly swung position to have its outer end seat against a shoulder of the user for bracing the camera, and being movable on its pivotal mounting to a folded position wherein it closely parallels a wall of the camera, said arm having a resilient member adapted to assume binding relation to a part of the camera whereby it is retained against chance movement from said folded position.

In testimony whereof, I affix my signature.

EDMUND S. BRADFIELD.